United States Patent [19]
Stahn et al.

[11] Patent Number: 5,983,626
[45] Date of Patent: Nov. 16, 1999

[54] INJECTION HEAD FOR ROCKET ENGINES

[75] Inventors: Bernhard Stahn, Ebenhausen; Hans-Joachim Klotz, Hörlkofen; Rüdiger Ewald, Beilngries, all of Germany

[73] Assignee: DaimlerChrysler AG, Germany

[21] Appl. No.: 08/883,402

[22] Filed: Jun. 26, 1997

[30] Foreign Application Priority Data

Jun. 27, 1996 [DE] Germany .......................... 196 25 735

[51] Int. Cl.$^6$ ........................................... F02K 9/00
[52] U.S. Cl. ............................................. 60/258; 239/562
[58] Field of Search ........................... 60/257, 258, 790; 239/562, 596

[56] References Cited

U.S. PATENT DOCUMENTS

| | | | |
|---|---|---|---|
| 3,194,012 | 7/1965 | Horrocks . | |
| 3,266,241 | 8/1966 | Jennings | 60/257 |
| 5,456,065 | 10/1995 | Dargies | 60/258 |
| 5,660,039 | 8/1997 | Sion et al. | 60/258 |
| 5,771,579 | 6/1998 | Farhangi et al. | 60/258 |

FOREIGN PATENT DOCUMENTS

| | | |
|---|---|---|
| PS 977 508 | 9/1966 | Germany . |
| AS 12 90 375 | 3/1969 | Germany . |

*Primary Examiner*—Charles G. Freay
*Attorney, Agent, or Firm*—McGlew and Tuttle, P.C.

[57] ABSTRACT

An injection head for rocket engines, in the combustion chambers of which one or more liquid propellants are chemically reacted to generate thrust, with a plurality of injection elements as well as with a distribution chamber arranged before these injection elements in terms of flow. The distribution chamber is divided into two chambers connected in series in terms of flow by means of a separator plate arranged at right angles to the longitudinal direction of the engine. The separator plate has a plurality of openings, each with a different flow cross section and with a defined direction of flow, wherein each opening is associated with one or more injection elements.

15 Claims, 1 Drawing Sheet

INJECTION HEAD FOR ROCKET ENGINES

FIELD OF THE INVENTION

The present invention pertains generally to an injection head for rocket engines, in the combustion chambers of which one or more liquid propellants are reacted chemically to generate thrust, and more particularly to an injection head with a plurality of injection elements, which are provided with at least one passage channel, divide a propellant flow into a plurality of individual flows and open into the combustion chamber, as well as with a distribution chamber, which is arranged before the injection elements in terms of flow.

BACKGROUND OF THE INVENTION

Locally greatly different flow and pressure conditions frequently occur in the distribution chamber arranged upstream of the injection elements due to the design, e.g., as a consequence of lateral admission through a line. Furthermore, high velocity components may occur at right angles to the direction of injection, i.e., highly unfavorable conditions may occur in the inlet area of the injection elements. The consequences are, among other things, a reduced propellant throughput, an unsatisfactory spray pattern, as well as deviations from one element to the next despite identical geometry. The consequence with respect to the engine is usually a loss of power, and harmful vibrations of the combustion chamber, nonuniform thermal loads/deformations, etc., may occur as well.

Such a rocket combustion chamber, which has an injection head with a simple distribution chamber (propellant collection chamber 4) supplied with propellant from one side, is described in, e.g., DE-AS 12 90 375. See especially FIG. 2 in this connection.

U.S. Pat. No. 3,194,012 pertains to the problem of a uniform velocity distribution in both distribution chambers of the injection head for the purpose of optimal cooling. The distribution chambers are divided into helical channels with adapted flow cross section pattern. This also has the drawback that high velocity components occur at right angles to the injection elements.

A rocket injection head, which is designed for high mechanical strength and uniform propellant distribution, has been known from DE-PS 977 508. Among other things, a plurality of radially arranged pipes, from which separate holes lead to every individual injection element, are provided for this purpose. When bearing the fact in mind that several hundred injection elements are present in large engines, it will soon become clear that the enormous expense of manufacture is not at a meaningful/acceptable ratio to the benefit. In addition, the many small, long channels lead to high and again locally different pressure drops. See especially FIGS. 2 and 3.

SUMMARY AND OBJECTS OF THE INVENTION

In light of the drawbacks of these solutions, the object of the present invention is to provide an injection head for rocket engines, which is characterized by defined, uniform and favorable pressure and flow conditions in the inlet area of the injection elements as well as by low pressure drops in the distribution chamber at a moderate design and manufacturing technical effort and consequently at a moderate expense, and which makes possible as a result an optimal propellant throughput, maximum engine output as well as uniform and stable combustion with minimal mechanical and thermal load of the engine.

According to the invention, an injection head for rocket engines having combustion chambers with one or more liquid propellants, especially one propellant and one oxidizer. These are reacted chemically to generate thrust, with a plurality of injection elements, which are provided with at least one passage channel. The injection elements divide a propellant flow into a plurality of individual flows and open into the combustion chamber. A distribution chamber is arranged before the injection elements in terms of flow. The distribution chamber is divided into two chambers connected in series in terms of flow by means of a separator plate. This plate is disposed substantially at right angles or approximately at right angles to the longitudinal direction of the engine (longitudinal central axis X). The separator plate has a plurality of openings, each with a defined flow cross section and with a defined direction of flow. Each opening is associated with one or more of the injection elements and is placed and oriented correspondingly.

The present invention provides for dividing the distribution chamber into two chambers connected in series in terms of flow by a perforated, transversely arranged separator plate. The separator plate is characterized by low weight, low fluidic losses as well as by a strong favorable effect (orientation, homogenization) on the flow and pressure conditions before the injection elements. Each of the many openings in the separator plate has a defined flow cross section and is associated with one or more injection elements, i.e., it is placed and oriented correspondingly.

A preferred exemplary embodiment of the injection head according to the invention involves the said separator plate being designed as a round, plate-shaped component with a substantially smaller, axial extension compared with the diameter. The fluidic openings are designed as holes or curved elongated holes distributed on a plurality of circles concentric to the—imaginary—axis of the separator plate (longitudinal central axis X).

The—imaginary—flow axes of all holes or elongated holes located on one such circle preferably intersect the—imaginary—axis of the separator plate (longitudinal central axis X) at one point or extend in parallel to same.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
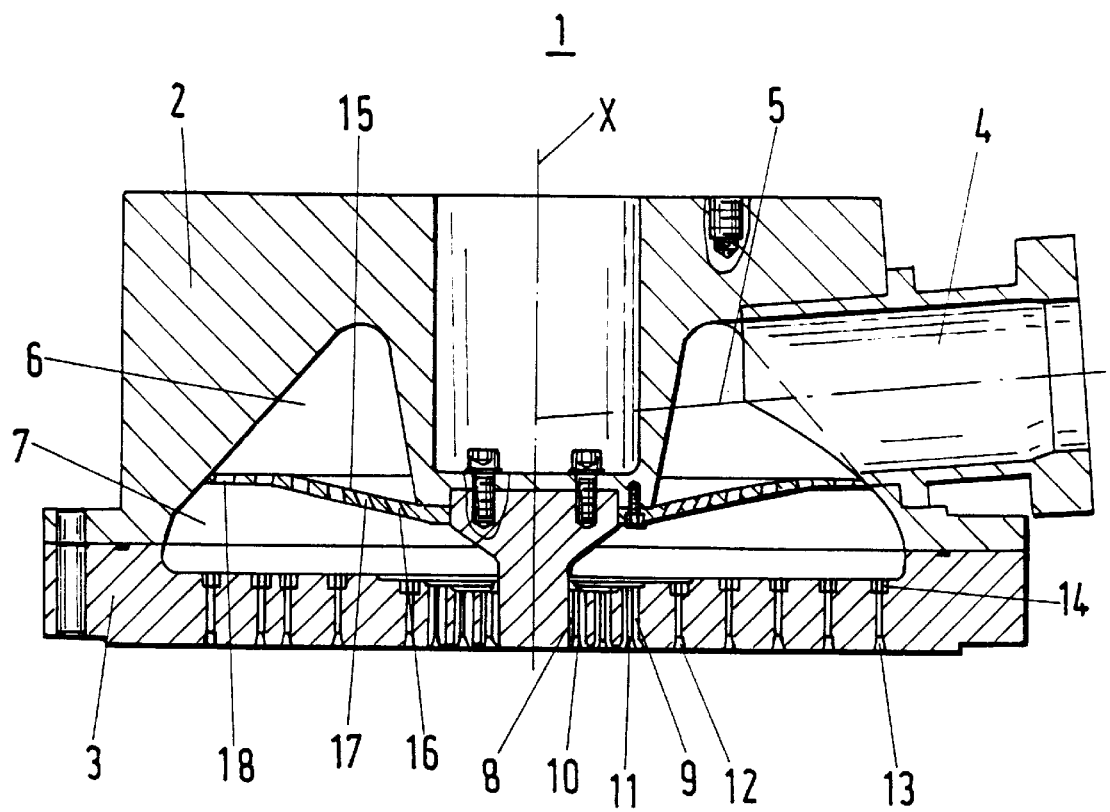
FIG. 1 is a cross sectional view through an injection head for flow experiments.

Referring to the drawings, the injection head 1 is provided especially for fluidic experiments for testing/optimizing the separator plate 15 and it is therefore of a simpler design in some respects than functioning engine injection heads. Thus, the injection head 1 is designed, e.g., for the throughput of one flow medium, i.e., one propellant only, i.e., quasi for monopropellant operation. Most rocket engines of a higher thrust operate with two propellants, i.e., biergolically or hypergolically, wherein the second propellant, e.g., liquid hydrogen, is pumped in between the injection elements for the first propellant, e.g., liquid oxygen, and is also injected into the combustion chamber, e.g., according to the coaxial principle. The present invention is unlimitedly applicable to such cases as well, and the person skilled in the art is familiar with the necessary design measures.

In contrast, the design shown offers the advantage of being clearer and easier to understand for presentation of the combination of features according to the invention. The structural and functional combination of features according to the invention may be applied as disclosed herein and with higher thrust operating arrangements with two propellants, i.e., biergolically or hypergolically and injected into the combustion chamber, e.g., according to the coaxial principle.

The injection head 1 comprises essentially the housing 2 and the front injection wall 3 fastened thereto. The vertical longitudinal central axis X would also correspond to the axis of the engine, and the combustion chamber would be located directly under the front wall 3. The flow medium/propellant enters first the upper chamber 6 of the rotationally symmetrical distribution chamber 5 from the side through the admission channel 4. The velocity and pressure conditions occurring during the operation, which may sometimes differ greatly, would not be optimal for a direct admission to the injection elements.

However, a plate-shaped separator plate 15 with a plurality of openings or direction channels 16, 17, 18 is installed here according to the present invention, and this separator plate exerts a certain throttling action on the flow, without generating greater pressure drops. The distribution, dimensioning and orientation of the openings are selected to be such that an extensively rotationally symmetrical pressure and velocity distribution occurs in the chamber 7 downstream of the separator plate 15, and the flow has a predominantly axial direction at least in most areas. It shall be mentioned here that only three of the plurality of openings or channels in the separator plate 15, some of which have different dimensions and orientations, are provided with reference numbers (16 through 18) as an example here. It can also be seen from FIG. 1, that direction channel 16 is radially spaced from associated injection elements 8, 9.

The orientation direction of the direction channels 16–18, insures a predominantly axial flow which decisively improves the intake into the injection elements. The extensively homogeneous pressure distribution ensures uniform, defined throughput values in conjunction with this.

The front wall 3 has a plurality of passage channels for dividing the flow from the distribution chamber into a plurality of individual flows, each in an injection direction, of which only four are provided with the reference numbers 10 through 13 as an example here. One peculiarity of the design shown is that some of the passage channels, e.g., 10 and 11, are incorporated in separate injection elements, e.g., 8 and 9, and the injection elements are inserted in the front wall 3. The other passage channels, e.g., 12 and 13, are incorporated directly in the massive front wall 3.

In the case of injection heads for functioning engines, all injection elements are usually designed as separately manufactured components that are correspondingly fastened in the injection head, but this does not affect the principle of the present invention.

Each passage channel in the injection head 1 shown can be considered quasi as an injection element.

It can be recognized that the passage channels incorporated in the front wall 3, e.g., the passage channels 12 and 13, are provided with separate calibrating inserts 14 on the inlet side. It can also be recognized that all passage channels expand toward the not shown combustion chamber at the end in the manner of a diffusor.

It can also be clearly seen in FIG. 1 how the openings in the separator plate 15 point toward the associated passage channels/injection elements with a flow axis sloped differently depending on the radial position.

Figure 2:
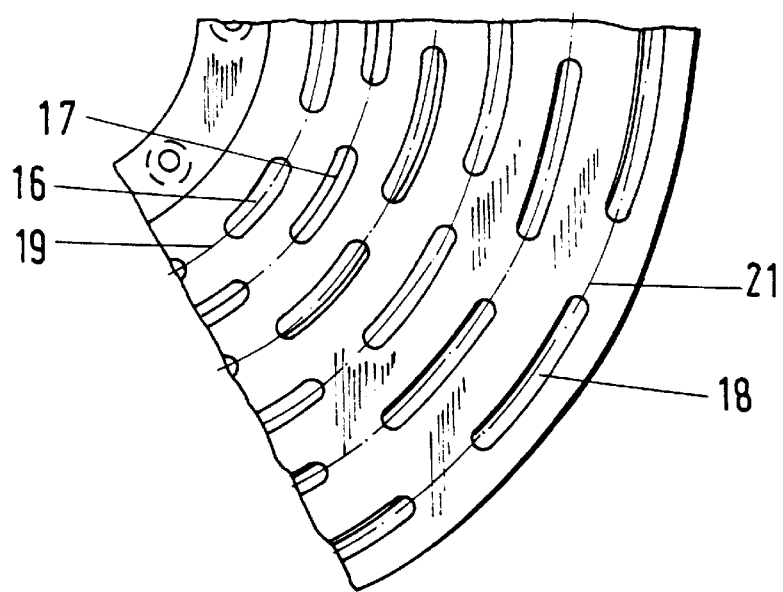
FIG. 2 is a partial top view of the separator plate of this injection head on a larger scale.

FIG. 2 shows a top view of part of the separator plate 15. It is seen that the openings or channels for the passage of the flow medium/propellant are designed as curved elongated holes arranged on concentric circles here. For example, the openings 16, 17, 18 are located on the circles 19, 20, 21. The shape of the opening shown can be prepared by, e.g., milling.

However, it is also possible to use other opening geometries, e.g., simple, cylindrical holes with correspondingly oriented flow axes.

FIG. 2 shows that all the openings or channels arranged on a certain circle have the same radial "angle of incidence" in relation to the longitudinal central axis of the separator plate, which "angle of incidence" may also be "zero" (parallelism).

While a specific embodiment of the invention has been shown and described in detail to illustrate the application of the principles of the invention, it will be understood that the invention may be embodied otherwise without departing from such principles.

What is claimed is:

1. An injection head for rocket engines, in the combustion chambers of which one or more liquid propellants are reacted chemically to generate thrust, comprising:

a plurality of injection elements, each injection element being provided with at least one passage channel, said injection elements dividing a propellant flow into a plurality of individual flows and opening into the combustion chamber;

a distribution chamber, arranged before said injection elements in terms of flow said distribution chamber having a separator plate dividing said distribution chamber into first and second chambers connected in series in terms of flow, said separator plate being arranged at right angles or approximately at right angles to a longitudinal direction of the engine, said separator plate having a plurality of direction channels, each direction channel having a defined flow cross section and with defined direction of flow, wherein each said direction channel is associated with one or more injection elements and is placed and oriented to direct flow from said first chamber to said second chamber in a flow direction toward said associated one or more injection elements, said flow direction being angularly spaced from said longitudinal direction of said engine.

2. The injection head in accordance with claim 1, wherein:
said separator plate is a round, plate-shaped component with a substantially smaller, axial extension compared with a diameter.

3. The injection head in accordance with claim 1, wherein:
said separator plate is a round, plate-shaped component with a substantially smaller, axial extension compared with a diameter;
said direction channels are designed as holes or curved elongated holes distributed on a plurality of circles concentric to an axis of said separator plate; and flow axes of all holes or elongated holes located on one circle intersect the axis of the separator plate at one point.

4. The injection head in accordance with claim 1, wherein:

said direction channels are radially spaced from said associated injection elements.

5. The injection head in accordance with claim 1, wherein:

said direction of flow toward said injection elements is angularly spaced from said longitudinal direction of the engine.

6. An injection head for rocket engines, in the combustion chambers of which one or more liquid propellants are reacted chemically to generate thrust, comprising:

a plurality of injection elements, each injection element being provided with at least one passage channel, said injection elements dividing a propellant flow into a plurality of individual flows and opening into the combustion chamber;

a distribution chamber, arranged before said injection elements in terms of flow said distribution chamber having a separator plate dividing said distribution chamber into two chambers connected in series in terms of flow, said separator plate being arranged at right angles or approximately at right angles to a longitudinal central axis of the engine, said separator plate having a plurality of channels, each channel having a defined flow cross section and with defined direction of flow, wherein each said channel is associated with one or more injection elements and is placed and oriented to define flow direction control means for changing a flow direction on an upstream side of said separator to a direction of flow substantially in a direction toward one or more injection elements.

7. The injection head in accordance with claim 6, wherein:

said separator plate is a round, plate-shaped component with a substantially smaller, axial extension compared with a diameter.

8. The injection head in accordance with claim 6, wherein:

said channels are designed as holes or curved elongated holes distributed on a plurality of circles concentric to an axis of said separator plate; and flow axes of all holes or elongated holes located on one circle intersect the axis of the separator plate at one point or extend in parallel to same.

9. The injection head in accordance with claim 6, wherein:

said channels are radially spaced from said associated injection elements.

10. The injection head in accordance with claim 6, wherein:

said direction of flow toward said injection elements is angularly spaced from said longitudinal central axis.

11. The injection head in accordance with claim 6, wherein said direction of flow toward said injection elements is also toward said longitudinal central axis.

12. An injection head comprising:

a housing defining a distribution chamber;

an injection wall on one side of said distribution chamber;

a plurality of injection elements in said injection wall, and dividing a flow from said distribution chamber into a plurality of individual flows in an injection direction;

a separator plate dividing said distribution chamber into first and second chambers connected in series in terms of flow, said second chamber being adjacent said injection wall, said separator plate defining a plurality of direction channels, each direction channel is associated with one injection element, said each direction channel is shaped and oriented to define flow direction control means for directing a flow from said first chamber into said second chamber toward said associated injection element, said direction channels are radially spaced from said associated injection element with respect to said injection direction.

13. The injection head in accordance with claim 12, wherein:

said flow toward said injection elements is angularly spaced from said injection direction.

14. The injection head in accordance with claim 12, wherein said flow toward said injection elements is toward said injection direction.

15. The injection head in accordance with claim 12, further comprising:

a lateral admission channel feeding a flow into said first chamber in a direction angularly spaced from said injection direction.

* * * * *